2 Sheets—Sheet 1.

A. C. LUDLUM.

ADDING AND WRITING MACHINE.

No. 11,147. Reissued Mar. 3, 1891.

Witnesses:
Charles Pickles,
M. S. Ruder.

Inventor:
Albert C. Ludlum,
By Fowler & Fowler
Attorneys.

2 Sheets—Sheet 2.

A. C. LUDLUM.

ADDING AND WRITING MACHINE.

No. 11,147. Reissued Mar. 3, 1891.

Witnesses:
Charles Pickles,
M. S. Ruder.

Inventor:
Albert C. Ludlum,
By Fowler & Fowler
Attorneys.

UNITED STATES PATENT OFFICE.

ALBERT C. LUDLUM, OF DENVER, COLORADO.

ADDING AND WRITING MACHINE.

SPECIFICATION forming part of Reissued Letters Patent No. 11,147, dated March 3, 1891.

Original No. 384,373, dated June 12, 1888. Application for reissue filed May 19, 1890. Serial No. 352,422.

*To all whom it may concern:*

Be it known that I, ALBERT C. LUDLUM, formerly residing at Brooklyn, county of Kings, and State of New York, and now residing at Denver, county of Arapahoe, and State of Colorado, have invented a certain new and useful Improvement in Adding and Writing Machines; and I hereby declare the following to be a full, clear, and exact description of the same.

I will describe a machine embodying my improvement, and then point out the various novel features in claims.

Figure 4:
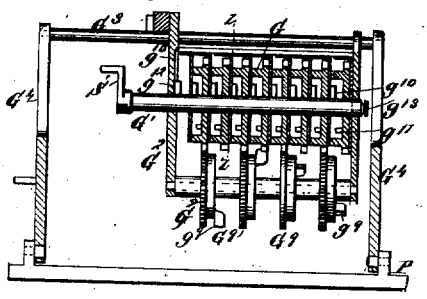
Figure 7:
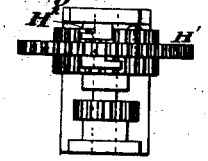
Figure 5:
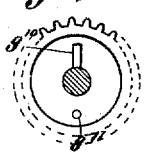
Figure 6:
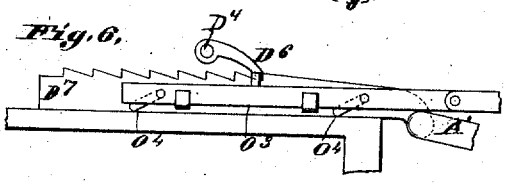
Figure 1:
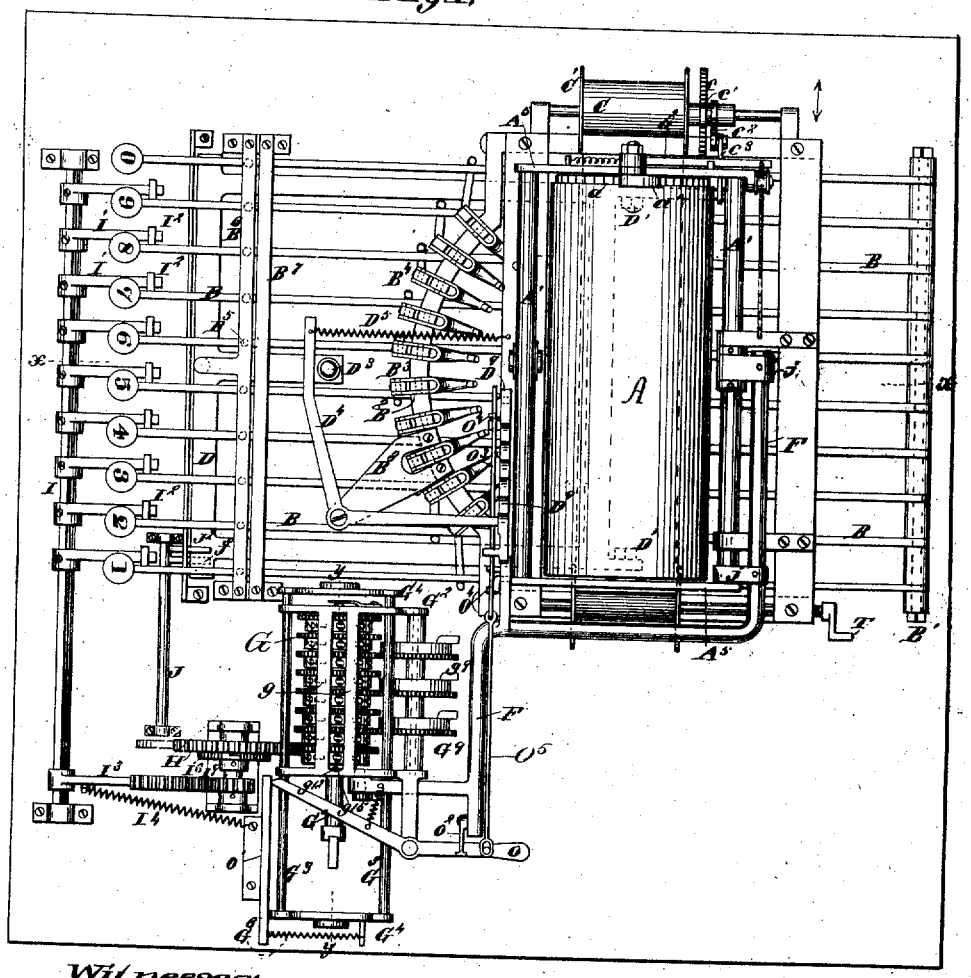
Figure 3:
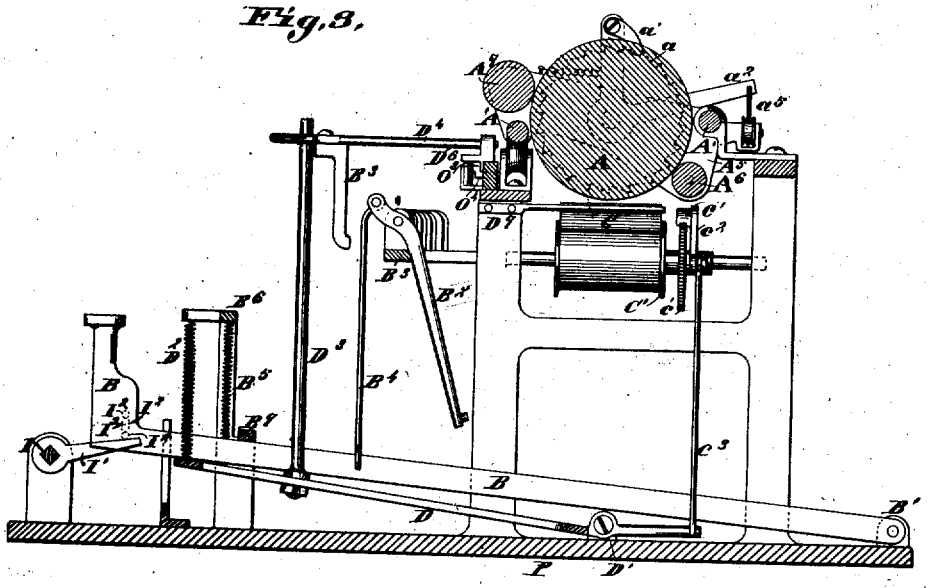
Figure 2:
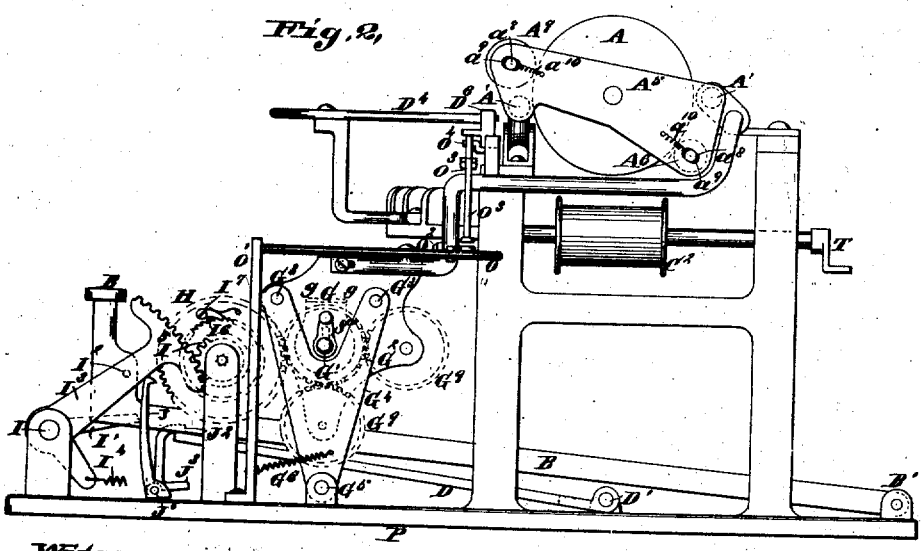

In the accompanying drawings, Figure 1 is a top view of a machine embodying my improvement. Fig. 2 is a side view of the same. Fig. 3 is a vertical section taken at the plane of the dotted line *x x*, Fig. 1. Fig. 4 is a vertical section of the adding mechanism of the machine, the section being taken as indicated by the dotted line *y y*, Fig. 1. Fig. 5 is a vertical section taken as indicated by the dotted line *z z*, Fig. 4. Fig. 6 is a front view of certain parts of the machine. Fig. 7 is a vertical section illustrating certain parts modified somewhat in form.

Similar letters of reference designate corresponding parts in all the figures.

A designates an impression-roller, which may be made of any suitable material. It preferably will have a surface of yielding material, such as india-rubber. The impression-roller, with its surface of yielding material, if used, constitutes an impression-surface for type. Around it passes paper upon which the writing is to be done. This roller is mounted in a carriage A′, which, during the operation of writing, is moved widthwise of the machine, or, in other words, in the direction of the double-headed arrow which appears adjacent to such carriage in Fig. 1.

$A^6$ $A^7$ designate rollers provided with journals $a^8$, extending through elongated slots $a^9$ in the end pieces $A^5$. Springs $a^{10}$, connected to the end pieces $A^5$ and to the journals $a^8$, provide for causing the rollers $A^6$ $A^7$ to bear against the impression-cylinder with a yielding pressure. The paper to be printed upon is held between the cylinder A and the rollers $A^6$ $A^7$.

B designates a number of levers which have finger-pieces marked with different figures at the front ends and which are fulcrumed at their rear ends to a rod B′, supported in stands erected upon the base-piece P of the machine. These levers B are connected between their fulcra and their front ends to type-levers $B^2$. These type-levers are fulcrumed between their ends to a bow-shaped bar $B^3$, and hence the rear ends of the type-levers, which are provided with the type or the figures whereby the writing is performed, converge toward a point which is about the center of the width of the machine. The type-levers are connected at their front ends by links $B^4$ with the levers B, so that when the forward ends of the levers B are depressed the rear ends of the type-levers, which are provided with the type, are forced upward against an inked ribbon C, which extends beneath the impression-roller A, and also to the paper, (not illustrated in the drawings,) which is passed around the latter. When a type-lever is thus caused to strike the ribbon C, it produces the impression of the figures which it bears upon the paper in a well-known manner. The levers B are normally maintained in a raised position by means of springs $B^5$. (Shown as connected to them near their forward ends and to a bar $B^6$, extending widthwise of the machine above the levers.) A stop-bar $B^7$ limits the upward movement of the levers. The springs $B^5$ raise the levers after they have been depressed.

Below the levers B the lever D is arranged. It is made in the form of a frame and extends the width of the whole series of levers B, so that it may be depressed upon the depression of any one of the levers B. This lever D is fulcrumed near the rear end by a pin D′, supported in stands erected upon the base-piece P of the machine. The forward end of the lever D is connected by a spring $D^2$ to the bar $B^6$, so that the forward end of the said lever D will always be raised and maintained in a raised position when the levers B are raised.

The lever D is provided with a rod or arm $D^3$, which extends up into proximity with one arm of an elbow-lever $D^4$, which is fulcrumed to an extension from the bow-shaped bar $B^3$. The arm of this lever $D^4$, upon which the arm or rod $D^3$ of the lever D acts, is held in contact with said arm or rod $D^3$ by means of a spring $D^5$. The other arm of the lever $D^4$ is provided with a pawl $D^6$, which engages with a rack-bar $D^7$, that is affixed to the carriage A′, in which the impression-roller A is journaled.

Whenever a lever B is depressed, the lever D will also be depressed, and the latter will effect the vibration of the lever $D^4$, so that the pawl $D^6$ of the latter will play over the teeth of the rack-bar $D^7$ and not move said rack. After such lever B shall have been released, it and the lever D will rise and the spring $D^5$ will cause the lever $D^4$ to vibrate in such direction that the pawl $D^6$ of the latter, operating in conjunction with the rack-bar $D^7$, will move the carriage A′, which is provided with the impression-roller, for a certain distance widthwise of the machine. In the present instance this movement of the carriage A′ will be to the right of a person occupying a position in front of the machine. It is intended that whenever it shall be desired to move the carriage carrying the impression-roller for a space to the right, and at a time when no figure is to be marked down, the lever B, whose finger-piece is marked with the cipher, shall be operated.

The ribbon C is mounted upon rollers C′ $C^2$. The roller $C^2$ is shown as provided with a hand-crank T, whereby it may be rotated. The roller C′ has affixed to it a ratchet-wheel $c$, which operates in conjunction with the pawl $c'$, carried by a lever $c^2$, which is connected by a link $c^3$ with the rear end of the lever D. When the lever D is raised at the front end by means of the spring $D^2$, its rear end will be depressed, and will then by means of the links $c^3$, pawl-lever $c^2$, and pawl $c'$ effect a partial rotation of the ratchet-wheel $c$, and consequently of the roller C′. In this way the ribbon will be fed along after each stroke of one of the type-levers.

The impression-roller may be rotated to make the spacing between lines or rows of figures by any suitable means. As shown, it is provided for this purpose with a ratchet-wheel $a$. With this ratchet-wheel is combined a pawl $a'$, carried by a pawl-lever $a^2$. This pawl-lever may be operated directly by vibrating it with the hand, or it may be operated by any suitable mechanism connected to one of its arms—as, for instance, by a cord $a^5$, connected to a stationary part of the frame of the machine at one end and at the other end to the lever, and which may be grasped by hand to operate the lever.

The adding mechanism consists of a number of wheels G, severally provided with a definite number of teeth at the periphery. I have shown eight of these wheels. These wheels severally bear upon the periphery a set of figures from 0 to 9, inclusive. Any one of these wheels may be rotated by being brought into engagement with a wheel H. In order that any of the wheels G may be brought into engagement with the wheel H, said wheels G are loosely mounted upon a shaft G′, which is supported in a frame or carriage $G^2$. The frame or carriage $G^2$ is free to slide widthwise of the machine along rods $G^3$. These rods $G^3$ are supported by brackets $G^4$, which are pivotally connected to stands $G^5$, erected on the base-piece P of the machine. Consequently the brackets $G^4$ and the rods $G^3$ may be vibrated forwardly and backwardly far enough to remove any of the wheels G which may be opposite the wheel H from engagement with said wheel H or back into engagement with the same. The frame, which is formed of the brackets $G^4$ and rods $G^3$, will be normally held in a forward position by means of a spring $G^6$, connected to one of the brackets $G^4$ and to an appurtenance of the base-piece P, which is stationary.

The carriage $G^2$, in which the wheels G are arranged, has a movement widthwise of the machine corresponding to the movement of the carriage A′ in the same direction. The carriage $G^2$ is connected to the carriage A′ by a bar F at $j$, and derives its movement widthwise of the machine from the carriage A′. It therefore constitutes in effect an appurtenance of the carriage A′, and the movement of the two carriages is in unison. This motion of the carriage $G^2$ will bring a different one of the wheels G into engagement with the wheel H, so that it will derive motion therefrom.

The wheels G are ordinary counting-wheels. When any one of them has completed a rotation, it imparts a partial rotation to the one indicating the next higher figure—as, for instance, the units-wheel will, upon completing a rotation, effect a partial rotation of the wheel indicating tens, and the latter will operate in the same manner in conjunction with the wheel indicating hundreds, and so on.

The figures on the peripheries of the wheels G may be read between two bars $g$, with which the carriage $G^2$ is provided. As shown more clearly in Fig. 2, each one of the wheels G engages with a gear-wheel $G^9$. The wheel $G^9$, corresponding to any particular wheel G, has a motion similar to that wheel G. Each of the wheels $G^9$ is provided with a single tooth $g^9$ (see Fig. 4) in addition to the series of teeth through which said wheel derives motion. The single tooth $g^9$ of each of these engages once in every rotation of its wheel with the wheel G of the next higher denomination, moving the latter one-tenth of a rotation whenever this happens.

The wheels G, as I have said, are all loosely arranged upon the shaft G′. This shaft G′ is provided with a hand-crank S′, whereby it may be rotated. It is also provided with a number of radially-extending pins $g^{10}$, as shown more clearly in Figs. 4 and 5. There is one of these pins for each of the wheels G. Each of the wheels G is provided with a short pin $g^{11}$, adapted at certain times to be brought into engagement with the pins $g^{10}$ for the purpose of rotating the wheels G, extending parallel with the shaft G′. The shaft G′ is capable of a slight longitudinal movement. Normally it will be held so that a radially-extending pin $g^{12}$, (shown more clearly in Fig. 4,) with which it is provided, will project into and engage with a cavity $g^{15}$ in one of the side pieces of the carriage $G^2$. It is thus held by a spring $g^{13}$, and when it is in this position its pins $g^{10}$ will not engage with the pins $g^{11}$ of the wheels G; but if it be pressed longitudinally against the resistance of the spring $g^{13}$ its pin $g^{12}$ will be disengaged from the side piece of the carriage $G^2$ with which it acts, thus leaving it free to rotate, and at the same time the pins $g^{10}$ will be brought into line with the pins $g^{11}$. If then the shaft be rotated, it will rotate the wheels G and bring them all into such positions that their ciphers will be visible between the bars $g$ of the carriage $G^2$.

I will now describe the manner in which the wheel H is operated.

I designates a rock-shaft having affixed to it a number of arms I′, which extend under lateral projections $I^2$, with which the levers B are provided. The projections $I^2$ of the levers B are not in the same horizontal plane; but each one occupies a different position with reference to others, as shown more clearly in Fig. 3. It will be observed that the lever B, whose finger-piece is marked with a cipher, has not one of these lateral projections $I^2$. The lateral projections of the levers B serve to rock the shaft I when such levers are depressed. Owing to the arrangement of the said lateral projections in different horizontal positions, and as the levers B all have the same range of movement, it will be evident that the different levers will effect oscillations of the rock-shaft I different distances from the others, because some of the levers B will move throughout greater distance than the others before acting upon the rock-shaft.

The rock-shaft I is provided with a toothed sector-lever $I^3$. One arm of this lever is connected to a spring $I^4$, which returns the lever and the rock-shaft I to their normal positions. This toothed sector-lever engages with a pinion $I^5$, affixed to the shaft upon which the wheel H is mounted. There is also affixed to this shaft a ratchet-wheel $I^6$. When the sector-lever $I^3$ is vibrated by the depression of one of the levers B, it will rotate the pinion $I^5$ and also the ratchet-wheel $I^6$ in such direction that the latter, coacting with the pawl $I^7$, which is pivotally connected to one side of the wheel H, will impart a rotary motion to said wheel H for a certain distance corresponding to the extent to which the rock-shaft I has been oscillated. This partial rotation of the wheel H will be transmitted to whichever one of the wheels G happens to be opposite to it.

The wheel H is shown as having combined with it a pawl or detent J, which is affixed to a rock-shaft J′. This rock-shaft J′ has also affixed to it two fingers $J^2$ $J^3$. The forward end of lever D plays between these fingers $J^2$ $J^3$. When the lever D is depressed at the forward end, it will depress the finger $J^3$, and so oscillate the rock-shaft J′ as to cause the detent J to engage with the teeth of the wheel H. This detent will then hold the wheel H stationary until the forward end of the lever D in rising comes in contact with the finger $J^2$ and oscillates the shaft J′ in the reverse direction, so as to disengage the detent J from the teeth of the wheel H. These ocillations of the rock-shaft J′ are so timed that after the completion of that oscillation of the rock-shaft I and sector-lever $I^3$, which is produced by the depression of a lever B, the wheel H will be locked, so that the reverse oscillation of the rock-shaft I and the sector-lever $I^3$, which is effected by the spring $I^4$, will not produce any rotation of the wheel H by any accident, and also so that after the completion of this last-referred-to oscillation of the rock-shaft I and sector-lever $I^3$ the detent J will be disengaged from the wheel H, so as to leave it free to be again partially rotated upon the oscillation of the rock-shaft I and sector-lever $I^3$ by the depression of a lever B.

Instead of combining with the rock-shaft J′ the fingers $J^2$ $J^3$ and the detent J, I may, as I have illustrated by Fig. 7, combine with the wheel H a ratchet-wheel H′, affixed rigidly to one side of it. Then a stop-pawl, which will permit it to rotate in one direction but prevent it from moving in the other direction, will serve every purpose.

The writing mechanism of the machine which I have described records the various sums to be added, and the adding mechanism makes the addition. The addition made by the mechanism may be afterward written at the foot of the columns of figures previously recorded. During the writing of the addition the adding mechanism may be rendered inoperative by vibrating a lever O. This lever is fulcrumed between its ends to an extension from the carriage $G^2$. The forward end of the lever bears against a stationary plate O′, and the lever is of such length and extends at such an angle forward of the pivot-frame that when vibrated in one direction its forward end may operate with a cam action upon the plate O′, and thereby swing backward the frame composed of the brackets $G^4$ and rods $G^3$, so as to remove from engagement with the wheel H whichever one of the wheels G was previously in engagement with it. When vibrated into a position to operate as described, it may, if desired, be locked in that position by a hook $O^2$. When the frame consisting of the brackets $G^4$ and rods $G^3$ is thus thrown back, so as to render the wheels G inoperative, the writing mechanism may be operated without producing any effect upon the adding mechanism. When, however, it is desired to thus remove the wheels G out of possible engagement with the wheel H and to provide for moving the carriage A′ and the carriage $G^2$ into any desired position, the lever O may be vibrated a little farther, so as to impart longitudinal motion to a bar $O^5$, which is connected with it by being provided with a slot that receives a pin that extends from the lever. When such motion is imparted to the bar $O^5$, it imparts motion to a bar $O^3$, which is pivotally connected with crank-arms $O^4$. The longitudinal movement of the bar $O^3$ causes the oscillation of the crank-arms, and this oscillation of the crank-arms in turn causes the bar $O^3$ to rise and elevate the pawl $D^6$, which effects the travel of the carriage A′, carrying the impression-roller. The pawl $D^6$ when thus elevated is rendered inoperative, so that the carriages $G^2$ and A′ may be moved widthwise of the machine at pleasure.

I do not desire to lay claim to the particular construction and arrangement of the adding-wheels and the shaft upon which the same are mounted, which I have shown and described.

What I claim as my invention, and desire to secure by Letters Patent, is—

1. The combination, with type mechanism, of a carriage provided with an impression-surface over which paper to be printed upon may pass, feed-rollers for the paper mounted in said carriage, a number of adding-wheels mounted in an appurtenance of the said carriage, and mechanism, substantially such as described, for operating the type mechanism and adding-wheels and for moving the said carriage and the adding-wheels in unison widthwise of the machine, substantially as specified.

2. The combination of type-levers, an impression-cylinder, a carriage in which said cylinder is mounted, a number of adding-wheels, a carriage in which said wheels are mounted connected to the carriage supporting the impression-cylinder, and mechanism, substantially such as described, for moving the said carriage and operating the type-levers and adding-wheels, substantially as specified.

3. The combination of an impression-cylinder, type-levers for operating in conjunction therewith, finger-levers for operating the type-levers, adding-wheels, a motor-wheel adapted to engage with the adding-wheels one at a time, and a rock-shaft for transmitting motion to the motor-wheel and deriving motion from the operation of the levers which actuate the type-levers, substantially as specified.

4. The combination of writing mechanism consisting, essentially, of type-levers and an impression-cylinder having a rotary and longitudinal movement, a carriage in which said cylinder is supported, adding mechanism, a carriage in which said adding mechanism is supported connected to the carriage of the impression-cylinder, an oscillating frame supporting the last-named carriage, and a cam-lever whereby this frame may be oscillated to render the adding mechanism inoperative, substantially as specified.

5. The combination of the carriage A′, an impression-cylinder supported on said carriage, a rack-bar connected to said carriage, a pawl for engaging with said rack-bar for the purpose of imparting motion to the carriage, adding mechanism, a carriage supporting the adding mechanism and connected to the carriage of the impression-cylinder, an oscillating frame supporting the carriage of the adding mechanism, a cam-lever whereby this frame may be oscillated, a connection between said lever and a device extending under the said pawl, whereby said pawl may be rendered inoperative at the same time that the adding mechanism is rendered inoperative by the oscillation of the lever, substantially as specified.

6. The combination of type-printing mechanism, adding mechanism, a carriage controlling the adding mechanism and printing mechanism, and a series of finger-keys governing the aforesaid mechanisms and carriage.

7. The combination of adding mechanism, a carriage controlling the same, and a series of finger-keys governing said adding mechanism and carriage.

8. The combination, with calculating mechanism variably controlled by finger-keys, of type-printing mechanism operated thereby, and a carriage governing the printing, also controlled by said finger-keys.

9. The combination of finger-keys of different denominations, adding mechanism operated thereby, type-printing mechanism controlled by the same finger-keys that operate the adding mechanism for recording the numbers registered by said adding mechanism, and disconnecting means for removing the adding mechanism from under the control of said finger-keys and rendering it inoperative.

10. The combination of finger-keys, adding mechanism controlled thereby, a carriage governing said adding mechanism, devices for automatically feeding the carriage as the finger-keys are operated, and detachable connections for removing said carriage from the control of the automatic feed, whereby the carriage may be moved into any desired position at pleasure.

11. The combination of adding mechanism, type-printing mechanism, finger-keys for operating said mechanisms, a carriage governing said adding and printing mechanisms, devices for automatically feeding the carriage as the finger-keys are operated, and detachable connections for removing said carriage from the control of the automatic feed, whereby the carriage may be moved into any desired position at pleasure.

ALBERT C. LUDLUM.

Witnesses:
WILLISFORD DEY,
RANDOLPH E. DEY.